(No Model.)

L. B. BECK.
CAR COUPLING.

No. 508,127. Patented Nov. 7, 1893.

Witnesses.
A. Ruppert
H. A. Daniels

Inventor:
Lewis B. Beck,
Per
Thomas P. Simpson
Atty.

UNITED STATES PATENT OFFICE.

LEWIS B. BECK, OF CUMBERLAND CITY, KENTUCKY, ASSIGNOR OF ONE-HALF TO JOSEPH L. HIGGINBOTHAM, OF SAME PLACE.

CAR-COUPLING.

SPECIFICATION forming part of Letters Patent No. 508,127, dated November 7, 1893.

Application filed July 25, 1893. Serial No. 481,398. (No model.)

*To all whom it may concern:*

Be it known that I, LEWIS B. BECK, a citizen of the United States, residing at Cumberland City, in the county of Clinton and State of Kentucky, have invented certain new and useful Improvements in Car-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to hooks which couple automatically when the cars come together and thus avoid the danger of the ordinary link and pin coupling.

The special object of my invention is to uncouple the hooks without exposing the brakeman to peril of life or limb. It will first be described in connection with the drawings and then pointed out in the claim.

Figure 1:
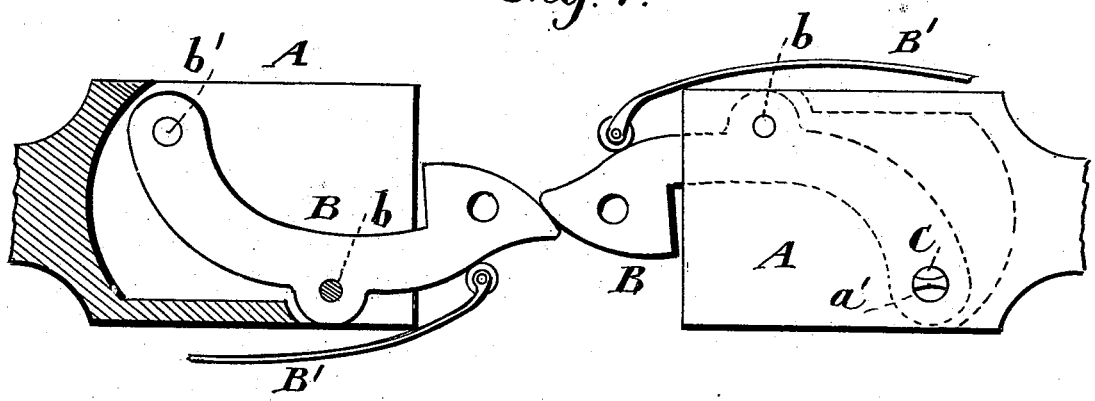
Figure 2:
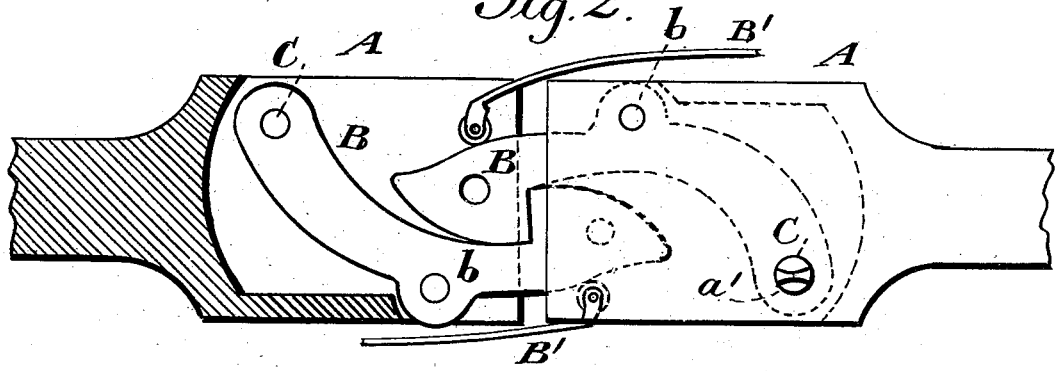
Figure 3:
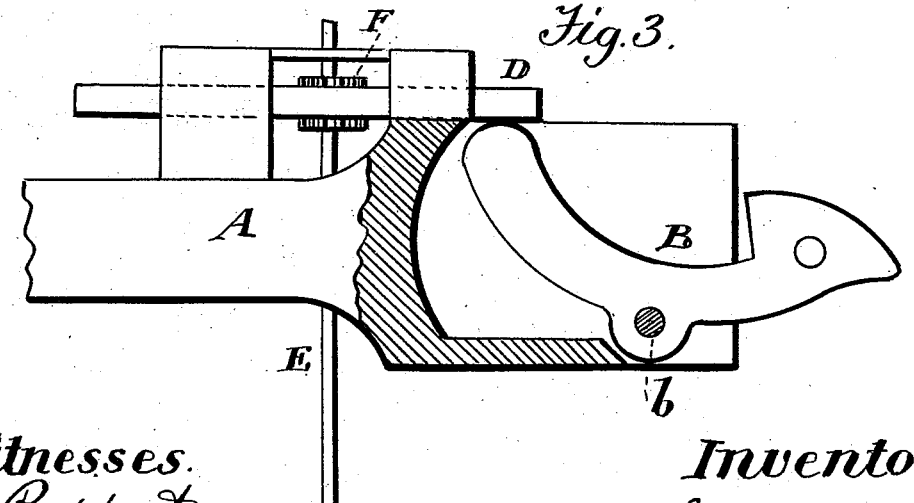

Figures 1 and 2 of the drawings are horizontal sections showing respectively the hooks when uncoupled and coupled; Fig. 3 a horizontal section, showing the rack and pinion lock as a modification.

In the drawings, A represents the drawhead and B the hook-coupling, there being intended to be one on each engaging drawhead, held to its position by a spring B'. The hook B is made on a curve and fulcrumed at $b$ on the outer or convex side so as to freely turn when pulled by the other hook and allow the two hooks to separate and their cars to be uncoupled.

At the rear end of the hook B is made a hole $b'$ which registers with a hole $a'$ in the drawhead. The bolt C, which has a head at one end, is dropped through both the holes $a'$ $b'$ so as to lock the hook and thus prevent any accidental uncoupling through accident or otherwise.

In Fig. 3 of the drawings, I show a modification which consists in a bolt D which is slid under the part $b^2$ of the hook, after it is coupled, when it cannot uncouple until this bolt is retracted. I do this by means of a shaft E turning in bearings of the drawhead and provided at one or both ends with a wheel or crank handle. On this shaft is fastened a pinion F which engages rack-teeth on the slide-bolt D. This lock is somewhat more convenient to operate from the side but both embody the same idea of locking the hook by a bolt which, being retracted, allows the cars to be uncoupled.

What I claim as new is—

The rod E, pinion F, rack D and hook B fulcrumed at $b$ to the drawhead, all combined and arranged in a car-coupling as shown and described.

In testimony whereof I affix my signature in presence of two witnesses.

LEWIS B. BECK.

Witnesses:
  C. A. PERDEU,
  A. B. DAVIS.